United States Patent
Kanda et al.

(10) Patent No.: US 11,475,346 B2
(45) Date of Patent: Oct. 18, 2022

(54) OPTIMIZATION DEVICE AND CONTROL METHOD OF OPTIMIZATION DEVICE

(71) Applicant: FUJITSU LIMITED, Kawasaki (JP)

(72) Inventors: Kouichi Kanda, Chofu (JP); Hirotaka Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 579 days.

(21) Appl. No.: 16/597,942

(22) Filed: Oct. 10, 2019

(65) Prior Publication Data

US 2020/0125984 A1     Apr. 23, 2020

(30) Foreign Application Priority Data

Oct. 19, 2018 (JP) .............................. JP2018-197198

(51) Int. Cl.
*G06N 10/00* (2022.01)
*G06F 15/173* (2006.01)
*G06F 17/16* (2006.01)
*G06N 7/00* (2006.01)

(52) U.S. Cl.
CPC .......... *G06N 10/00* (2019.01); *G06F 15/173* (2013.01); *G06F 17/16* (2013.01); *G06N 7/005* (2013.01)

(58) Field of Classification Search
CPC ...... G06N 10/00; G06N 7/005; G06F 15/173; G06F 17/16
See application file for complete search history.

(56) References Cited

U.S. PATENT DOCUMENTS

| | | | |
|---|---|---|---|
| 2015/0254890 A1* | 9/2015 | Noma ................ | G06N 20/00 345/419 |
| 2016/0063391 A1 | 3/2016 | Hayashi et al. | |
| 2017/0364477 A1* | 12/2017 | Thach ................ | G06N 3/0445 |
| 2018/0075342 A1 | 3/2018 | Tamura et al. | |
| 2020/0042570 A1* | 2/2020 | Tamura ................ | G06N 3/063 |

(Continued)

FOREIGN PATENT DOCUMENTS

| | | |
|---|---|---|
| JP | 8-50572 | 2/1996 |
| JP | 10-247186 | 9/1998 |

(Continued)

OTHER PUBLICATIONS

Sanroku Tsukamoto et al., "An Accelerator Architecture for Combinatorial Optimization Problems", Fujitsu Scientific & Technical Journal (FSTJ), vol. 53, No. 5, Sep. 1, 2017, pp. 8-13, XP55673462.

(Continued)

*Primary Examiner* — David E Choi
(74) *Attorney, Agent, or Firm* — Fujitsu Patent Center

(57) ABSTRACT

An optimization device includes: k first calculation circuits, N−k second calculation circuits, a selection circuit, an identification information calculation circuit and an update circuit. The first calculation circuit calculates a first energy change of an Ising model due to a change of a value of one of k first bits having values of 1 and a change of a value of a second bit having a value of 0 selected based on a generated first random number. The second calculation circuit calculates a second energy change of the Ising model due to a change of a value of one of (N−k) third bits having the values of 0 and a change of a value of a fourth bit having a value of 1 selected based on a generated second random number.

6 Claims, 8 Drawing Sheets

(56) References Cited

U.S. PATENT DOCUMENTS

| | | | |
|---|---|---|---|
| 2020/0050921 A1* | 2/2020 | Tamura | G06N 3/0445 |
| 2020/0074279 A1* | 3/2020 | Koyama | G06N 3/0472 |
| 2020/0090026 A1* | 3/2020 | Shibasaki | G06F 17/18 |
| 2020/0110790 A1* | 4/2020 | Yoneoka | G06N 3/0472 |
| 2020/0167635 A1* | 5/2020 | Tsukamoto | G06N 3/063 |

FOREIGN PATENT DOCUMENTS

| | | |
|---|---|---|
| JP | 2016-103282 | 6/2016 |
| JP | 2018-041351 | 3/2018 |

OTHER PUBLICATIONS

H. Zhu et al., "A Parallel Algorithm of Boltzmann machine with Rejectionless Method", 6th WSEAS Int. Conf. on Neural Networks, Jun. 16, 2005, 5 pages, XP55673739.

EESR—The Extended European Search Report of European Patent Application No. 19202171.5 dated Mar. 12, 2020.

EPOA—Official Communication of European Patent Application No. 19202171.5 dated Nov. 27, 2021. ** Non-Patent Literature cited in the EPOA was previously submitted in the IDS filed on May 7, 2020.

EPOA—Official Communication of European Patent Application No. 19202171.5 dated Mar. 23, 2022.

EPOA—Oral proceedings of European Patent Application No. 19202171.5 dated Aug. 25, 2021. ** Reference cited in the EPOA was previously submitted in IDS filed on May 7, 2020.

Chinese Office Action dated Apr. 21, 2022 for corresponding Chinese Patent Application No. 201910983160.5, with English Translation, 22 pages. *Please note NPL "An Accelerator Architecture for Combinatorial Optimization Problems". . . cited herewith, was previously cited in an IDS filed on May 7, 2020.*.

* cited by examiner

OPTIMIZATION DEVICE AND CONTROL METHOD OF OPTIMIZATION DEVICE

CROSS-REFERENCE TO RELATED APPLICATION

This application is based upon and claims the benefit of priority of the prior Japanese Patent Application No. 2018-197198, filed on Oct. 19, 2018, the entire contents of which are incorporated herein by reference.

FIELD

The embodiments discussed herein are related to an optimization device and a control method of the optimization device.

BACKGROUND

As a method of solving a multivariate optimization problem which is not easily handled by a Neumann-type computer, there is an optimization device (there is also a case of being referred to as Ising machine or Boltzmann machine) using an Ising-type energy function. The optimization device calculates a problem to be calculated by replacing the problem with an Ising model which is a model representing a behavior of a spin of a magnetic body.

The optimization device is also capable of being modeled, for example, using a neural network. In this case, each of a plurality of bits which corresponds to a plurality of spins included in the Ising model functions as a neuron which outputs 0 or 1 in accordance with another bit and a weighted value (also referred to as a coupling factor) indicating a magnitude of interaction between the other bit and the own bit. The optimization device uses, for example, a probabilistic search method, such as simulated annealing, to find a state (a combination of values of respective bits) in which the minimum value among values (hereinafter, referred to as energy) of energy function described above (also referred to as cost function or objective function) is obtained, as a solution.

In the related art, there is an optimization device which calculates a state in which energy is minimized by performing simulated annealing using a digital circuit (for example, see Japanese Laid-open Patent Publication No. 2018-041351). The optimization device in the related art calculates an energy change by changing by a value of only one bit at a time, and determines whether or not to permit the change of the bit according to a value obtained by adding a noise value corresponding to temperature to the energy change. A change in the value of the bit with increasing energy is also permitted with a predetermined probability, the lower the temperature the lower the probability.

Meanwhile, an optimization problem includes a constraint (k-hot constraint) that the number of bits having a value of 1 is k (>1) in all of bits. For example, many partitioning problems (a problem of selecting optimal k from N given choices such as a graph partitioning problem and the like), a traffic optimization problem, and the like have k-hot constraints.

Japanese Laid-open Patent Publication No. 2016-103282, Japanese Laid-open Patent Publication No. 10-247186, and Japanese Laid-open Patent Publication No. 8-50572 are examples of related art.

As described above, in the optimization device in the related art, the number of bits to be changed at a time is one. For example, the optimization device in the related art searches for a ground state in which energy becomes minimum by repeating state transition of Hamming distance=1. For this reason, in the optimization device in the related art, transition to a state not satisfying the k-hot constraint also occurs, and the number of states in which the transition may occur (search space) is larger than the number of states satisfying the k-hot constraint. The state transition takes time due to an energy barrier generated for a k-hot constraint term. From the above, in the optimization device in the related art, there is a problem that it takes time to calculate an optimization problem having the k-hot constraint (search for a ground state).

As one aspect, the present disclosure provides an optimization device and a control method of the optimization device capable of reducing a calculation time of an optimization problem having a k-hot constraint.

SUMMARY

According to an aspect of the embodiments, an optimization device includes: k first calculation circuits, N−k second calculation circuits, a selection circuit, an identification information calculation circuit and an update circuit. The first calculation circuit calculates a first energy change of an Ising model due to a change of a value of one of k first bits having values of 1 and a change of a value of a second bit having a value of 0 selected based on a generated first random number. The second calculation circuit calculates a second energy change of the Ising model due to a change of a value of one of (N−k) third bits having the values of 0 and a change of a value of a fourth bit having a value of 1 selected based on a generated second random number.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
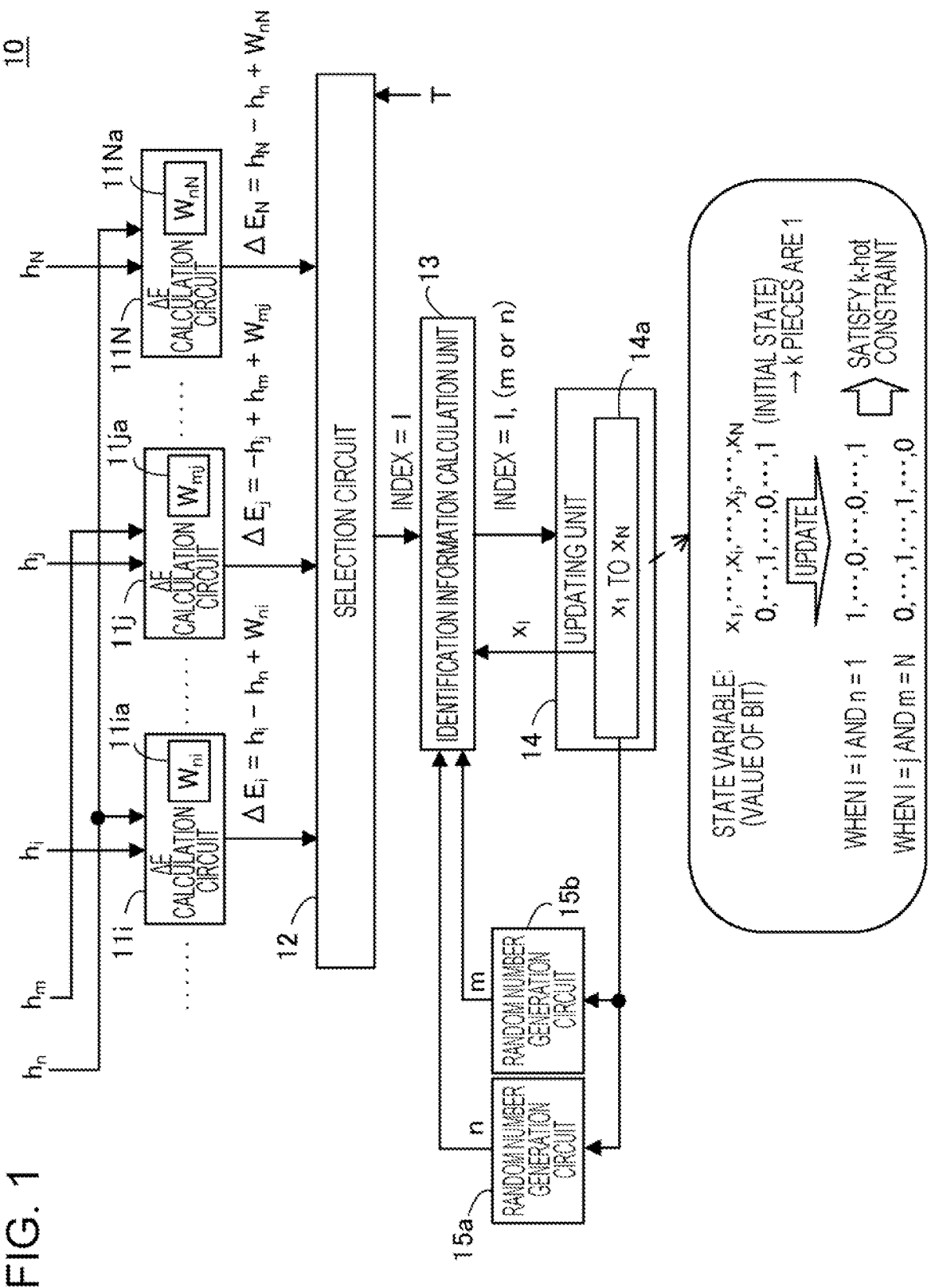
FIG. 1 is a diagram illustrating an example of an optimization device according to a first embodiment.

Hereinafter, embodiments are described with reference to the accompanying drawings.

An optimization device to be described below shortens a calculation time of an optimization problem having a k-hot constraint by excluding a search of a state other than a state satisfying the k-hot constraint.

In a case where values of N bits corresponding to a plurality of spins (the number of spins=N (N>2)), included in an Ising model obtained by converting the problem to be calculated, are represented by $x_1$ to $x_N$ which are state variables, the k-hot constraint is satisfied when the number of state variables having a value of 1 is k (where k>1).

For example, in a case where N=3 and k=2 to simplify the description, a state of $(x_1, x_2, x_3)$=(0, 1, 1), (1, 0, 1), or (1, 1, 0) satisfies the 2-hot constraint. On the other hand, a state of $(x_1, x_2, x_3)$=(0, 0, 0), (0, 0, 1), (0, 1, 0), (1, 0, 0), or (1, 1, 1) does not satisfy the 2-hot constraint.

In order to transition from one state satisfying the k-hot constraint to another state satisfying the k-hot constraint, the optimization device changes a bit having a value of 1 and a bit having a value of 0 one by one in one state updating process. For example, the optimization device generates state transition of Hamming distance=2.

The k-hot constraint may be represented by the following equation (1).

$$\sum_{i=1}^{N} x_i = k \quad (1)$$

$x_1$ is a state variable which represents a value of a bit corresponding to index (bit identification information)=i.

An energy function of the optimization problem in consideration of the k-hot constraint may be represented as the following equation (2).

$$E(x) = \Sigma \text{Cost}(x_i) + \lambda_1 (\Sigma x_i - k)^2 + \lambda_2 f_2(x_i) + \ldots + \lambda_{tN} f_t(x_i) \quad (2)$$

In the equation (2), the first item on the right side represents a cost function, the second item represents a k-hot constraint term in consideration of the k-hot constraint, and the third and the following items represent a constraint term in consideration of other constraints. A sufficiently large value is used as $\lambda_1$ (a constraint weight) so that energy does not decrease in a case where the k-hot constraint is not satisfied.

On the other hand, an Ising-type energy function E(x) using a weighted value is defined, for example, by the following equation (3).

$$E(x) = -\sum_{\langle i,j \rangle} W_{ij} x_i x_j - \sum_i b_i x_i \quad (3)$$

The first term on the right side is an integration of products of values (0 or 1) of two bits and a weighted value without leakage and duplication, for all the combinations of two bits selectable from all bits included in the Ising model, $x_j$ is a state variable representing a value of a bit corresponding index=j, and $W_{ij}$ is a weighted value indicating a magnitude of interaction of bits corresponding index=i, j. In addition, $W_{ii}$=0. $W_{ij}$=$W_{ji}$ in many cases (for example, a coefficient matrix by the weighted value is a symmetric matrix in many cases).

The second term on the right side is a sum of products of respective bias values of all the bits and values of the bits. $b_i$ indicates a bias value of a bit corresponding index=i.

In a case where a search is performed also for a state other than the state satisfying the k-hot constraint, the number of bits for representing $W_{ij}$ in the equation (3) increases as a value of $\lambda_1$ in the equation (2) increases. $\lambda_1$ is determined, for example, in consideration of a balance between N (corresponding to a size of the problem) described above and $W_{ij}$. For example, $W_{ij}$ or $b_i$ is first calculated using $\lambda_1$ of approximately 10 times the maximum value of $W_{ij}$, and energy minimization is performed. When a convergence solution does not satisfy the k-hot constraint, the value of $\lambda_1$ is increased until the k-hot constraint is satisfied.

On the other hand, in a case where only the state satisfying the k-hot constraint is searched, the number of bits for representing $W_{ij}$ may be reduced since the second k-hot constraint term in the right side in the equation (2) may be deleted.

Meanwhile, in the equation (3), when a value of $x_i$ changes to $1-x_i$, an increment of $x_i$ is represented as $\Delta x_i$=$(1-x_i)-x_i=1-2x_i$. An energy change ($\Delta E_i$) due to the change of the value is represented by the following equation (4).

$$\Delta E_i = E(x)|_{x_i \to 1-x_i} - E(x) = -\Delta x_i \left( \sum_j W_{ij} x_j + b_i \right) = -\Delta x_i h_i \quad (4)$$

In the equation (4), $\Delta x_i$ becomes −1 when $x_i$ changes from 1 to 0, and $\Delta x_i$ becomes 1 when $x_i$ changes from 0 to 1. $h_i$ is called a local field value (a local field), and the product of $h_i$ by a sign (+1 or −1) according to $\Delta x_i$ is $\Delta E_i$.

A change in $h_i$ when $x_j$ changes from 0 to 1 is $\Delta h_i^{(j)}$=+$W_{ij}$, and a change in $h_i$ when $x_j$ changes from 1 to 0 is $\Delta h_i^{(j)}$=−$W_{ij}$. In the same manner, a change in $h_j$ for a bit corresponding index=j when $x_i$ changes may be represented as $\Delta h_j^{(i)}$=$\Delta x_i W_{ij}$.

Therefore, an energy change when both of $x_i$ and $x_j$ change may be represented by the following equation (5).

$$\Delta E_{ij} = -\Delta x_i h_i - \Delta x_j (h_j + \Delta x_i W_{ij}) = -\Delta x_i h_i - \Delta x_j h_j - \Delta x_i \Delta x_j \Delta W_{ij} \quad (5)$$

As described above, in order to transition from one state satisfying the k-hot constraint to another state satisfying the k-hot constraint, a bit having a value of 1 and a bit having a value of 0 are changed one by one. When an energy change when a value of a bit corresponding index=i changes from 1 to 0 and a value of a bit corresponding index=j changes from 0 to 1 is represented as $\Delta E_j$, $\Delta x_i$=−1 and $\Delta x_j$=1 in the equation (5), so that $\Delta E_j$ may be represented by the following equation (6).

$$\Delta E_j = h_i - h_j + W_{ij} \quad (6)$$

The optimization device to be described below includes a circuit which calculates the energy change represented by the equation (6).

First Embodiment

FIG. 1 is a diagram illustrating an example of an optimization device according to a first embodiment.

An optimization device 10 includes N ΔE calculation circuits (for example, including ΔE calculation circuit 11$i$, 11$j$, and 11N in FIG. 1), a selection circuit 12, an identification information calculation unit 13, an updating unit 14, and random number generation circuits 15$a$ and 15$b$.

Among the N ΔE calculation circuits, k (k>1) ΔE calculation circuits (the ΔE calculation circuits 11$i$ and 11N and the like in the example in FIG. 1) perform the following processes.

A local field value (for example, $h_i$ and $h_N$) for one of k bits having a value of 1 is supplied to each of the k ΔE calculation circuits, among N bits. A local field value ($h_n$) for a bit (a bit corresponding to index=n) having a value of 0 selected based on a generated random number (n) is supplied to each of the k ΔE calculation circuits. In FIG. 1, a circuit which calculates the local field value, a circuit which controls propagation of the local field value to the ΔE calculation circuit, and the like are not illustrated.

Each of the k ΔE calculation circuits includes a storage unit (for example, storage units 11ia and 11Na) which stores a weighted value indicating a magnitude of interaction between one of k bits and a bit corresponding to index=n. Each of the k ΔE calculation circuits calculates an energy change of the Ising model by a change in one of k bits and the value of the bit corresponding to index=n, based on the supplied two local field values and the weighted value.

For example, $h_i$ and $h_n$ for a bit corresponding to index=i having a value of 1 are supplied to the ΔE calculation circuit 11i which is one of the k ΔE calculation circuits. The storage unit 11ia of the ΔE calculation circuit 11i stores $W_{ni}$. The ΔE calculation circuit 11i calculates an energy change ($ΔE_i$) by a bit corresponding to index=i and a bit corresponding to index=n being changed, based on $h_i$, $h_n$, and $W_{ni}$. Since $ΔE_i$ is in a case of $h_j=h_n$ and $W_{ij}=W_{ni}$ (where $W_{ni}=W_{in}$) in the equation (6), $ΔE_i$ may be represented as $ΔE_i=h_i-h_n+W_{ni}$.

In the same manner, $h_N$ and $h_n$ for a bit corresponding to index=N having a value of 1 are supplied to the ΔE calculation circuit 11N which is one of the k ΔE calculation circuits. The storage unit 11Na of the ΔE calculation circuit 11N stores $W_{nN}$. The ΔE calculation circuit 11N calculates an energy change ($ΔE_N$) by a bit corresponding to index=N and a bit corresponding to index=n being changed, based on $h_N$, $h_n$, and $W_{nN}$. Since $ΔE_N$ is in a case of $h_j=h_n$ and $W_{ij}=W_{nN}$ (where $W_{nN}=W_{Nn}$) in the equation (6), $ΔE_N$ may be represented as $ΔE_N=h_N-h_n+W_{nN}$.

On the other hand, among the N ΔE calculation circuits, (N−k) ΔE calculation circuits (the ΔE calculation circuit 11j and the like in the example in FIG. 1) perform the following processes. A local field value (for example, $h_j$) for a bit having a value of 0 is supplied to each of the (N−k) ΔE calculation circuits, among N bits. A local field value ($h_m$) for a bit (a bit corresponding to index=m) having a value of 1 selected based on a generated random number (m) is supplied to each of the (N−k) ΔE calculation circuits. m is a random number generated by using a seed different from n.

Each of the (N−k) ΔE calculation circuits includes a storage unit (for example, a storage unit 11ja) which stores a weighted value indicating a magnitude of interaction between one of (N−k) bits having a value of 0 and a bit corresponding to index=m. Each of the (N−k) ΔE calculation circuits calculates an energy change of the Ising model by a change in one of (N−k) bits and the bit corresponding to index=m, based on the supplied two local field values and the weighted value.

For example, $h_j$ and $h_m$ for a bit corresponding to index=j having a value of 0 are supplied to the ΔE calculation circuit 11j. The storage unit 11ja of the ΔE calculation circuit 11j stores $W_{mj}$. The ΔE calculation circuit 11j calculates an energy change ($ΔE_j$) by a bit corresponding to index=j and a bit corresponding to index=m being changed, based on $h_j$, $h_m$, and $W_{mj}$. Since $ΔE_j$ is in a case of $h_i=h_m$ and $W_{ij}=W_{mj}$ in the equation (6), $ΔE_j$ may be represented as $ΔE_j=h_j-h_m+W_{mj}$.

The N ΔE calculation circuits are realized, for example, by using an adder or a subtractor. The storage unit included in the ΔE calculation circuit is realized by, for example, a register, a static random access memory (SRAM), or the like.

The selection circuit 12 outputs index=l for identifying a bit permitted to be updated, based on a magnitude relationship between thermal excitation energy and an energy change output from each of the N ΔE calculation circuits. The thermal excitation energy is determined based on a random number and a temperature parameter (T) input from a control unit (not illustrated).

In a case where simulated annealing is performed, for example, T is controlled by the control unit so that a value becomes smaller each time a process of updating the state of the Ising model is repeated a predetermined number of times. An example of a circuit of executing a function of the selection circuit 12 as described above will be described below.

The identification information calculation unit 13 outputs one of index=m and index=n, based on a value ($x_l$) of a bit corresponding to index=l output by the selection circuit 12. The random number generation circuits 15a and 15b supply m and n. In a case where $x_l$ is 0, index=m of a bit having a value of 1 is output. In a case where $x_l$ is 1, index=n of a bit having a value of 0 is output. The identification information calculation unit 13 may be realized by, for example, a selector.

In the example in FIG. 1, the identification information calculation unit 13 also outputs index=l, but in a case where index=l output by the selection circuit 12 is directly supplied to the updating unit 14, the identification information calculation unit 13 may not output index=l.

The updating unit 14 includes a storage unit 14a which holds values ($x_1$ to $x_N$) of N bits. The storage unit 14a is realized by, for example, using a register, an SRAM, or the like. The updating unit 14 respectively updates $x_l$ and a value ($x_m$) of a bit corresponding to index=m or a value ($x_n$) of a bit corresponding to index=n, based on index=l and index=m or index=n.

Although not illustrated in FIG. 1, index=l, m, n is further used so as to update a local field value for each of bits.

Among the N bits, the random number generation circuit 15a outputs the random number (n) which is one of indexes of bits having a value of 0, based on $x_1$ to $x_N$. For example, the random number generation circuit 15a is realized by a circuit which outputs indexes of (N−k) bits having a value of 0 among $x_1$ to $x_N$, a circuit which selects one of the output (N−k) indexes by using a random number, and a circuit which generates the random number. An example of the circuit which generates a random number includes, for example, a linear feedback shift register (LFSR).

Among the N bits, the random number generation circuit 15b outputs the random number (m) which is one of indexes of bits having a value of 1, based on $x_1$ to $x_N$. For example, the random number generation circuit 15b is realized by a circuit which outputs indexes of k bits having a value of 1 among $x_1$ to $x_N$, a circuit which selects one of the output k indexes by using a random number, and a circuit which generates the random number.

Hereinafter, an operation example of the optimization device 10 will be described. First, an initial setting is performed. For example, the initial setting includes a process in which after all of $x_1$ to $x_N$ are set to 0 under control of a control unit (not illustrated), values of k bits are set to 1 by using a random number and values of other bits are set to 0 or an initial value setting of a local field value.

After then, the random number generation circuits 15a and 15b outputs n and m. In this way, although not illustrated in FIG. 1, $h_n$ is supplied from a circuit which updates $h_n$ to the k ΔE calculation circuits, and $h_m$ is supplied from a circuit which updates $h_m$ to the (N−k) ΔE calculation circuits.

Each of weighted values indicating a magnitude of interaction between each of bits having a value of 1 and a bit corresponding to index=n is supplied from a storage unit (not illustrated) which stores all of the weighted values to the storage unit of the corresponding ΔE calculation circuit among the k ΔE calculation circuits. For example, as illustrated in FIG. 1, $W_{ni}$ is supplied to the storage unit 11ia of the ΔE calculation circuit 11i, and $W_{nN}$ is supplied to the storage unit 11Na of the ΔE calculation circuit 11N.

Each of weighted values indicating a magnitude of interaction between each of bits having a value of 0 and a bit corresponding to index=m is supplied from a storage unit which stores all of the weighted values to the storage unit of the corresponding ΔE calculation circuit among the (N−k) ΔE calculation circuits. For example, as illustrated in FIG. 1, $W_{mj}$ is supplied to the storage unit 11ja of the ΔE calculation circuit 11j.

The k ΔE calculation circuits and the (N−k) ΔE calculation circuits calculate the energy change as described above, and the selection circuit 12 outputs index=l identifying a bit having a value permitted to be updated among the N bits.

The identification information calculation unit 13 outputs m supplied from the random number generation circuit 15b as an index in a case of $x_l$ is 0, and outputs n supplied from the random number generation circuit 15a as an index in a case of $x_l$ is 1.

The updating unit 14 respectively updates $x_l$ and $x_m$ or $x_n$, based on index=l and index=m or index=n. FIG. 1 illustrates an example of updating a state. For example, according to an initial setting process, the state becomes a state (an initial state) in which among $x_1$ to $x_N$, k bits including $x_i$ and $x_N$ are 1 and (N−k) bits including $x_1$ and $x_j$ is 0. In a case where index=l output by the selection circuit 12 is equal to index=i, $x_i$ is 1, so that the identification information calculation unit 13 outputs n as an index. In a case of n=1, the updating unit 14 updates $x_1$ from 0 to 1 and updates $x_i$ from 1 to 0. In a case where index=l is equal to index=j, $x_j$ is 0, so that the identification information calculation unit 13 outputs m as an index. In a case of m=N, the updating unit 14 updates $x_N$ from 1 to 0 and updates $x_j$ from 0 to 1.

In any case, since one bit having a value of 1 and one bit having a value of 0 are respectively updated, the updated state also satisfies the k-hot constraint. Thus, transition between the states satisfying the k-hot constraint may be performed.

In a case where $x_i$ is updated from 1 to 0, the ΔE calculation circuit 11i is one of the (N−k) ΔE calculation circuits. After the random number generation circuits 15a and 15b generate new n and m, $h_m$ is supplied to the ΔE calculation circuit 11i, and $W_{mi}$ is stored in the storage unit 11ia. In a case where $x_j$ is updated from 0 to 1, the ΔE calculation circuit 11j is one of the k ΔE calculation circuits. After the random number generation circuits 15a and 15b output new n and m, $h_n$ is supplied to the ΔE calculation circuit 11j, and $W_{nj}$ is stored in the storage unit 11ja.

As described above, among the N ΔE calculation circuits, the ΔE calculation circuit to which $h_m$ and $h_n$ are supplied changes each time $x_1$ to $x_N$ are updated. The weighted value stored in the storage unit in the ΔE calculation circuit is also updated.

After supply destinations of $h_m$ and $h_n$ are changed or the weighted value is updated, in the same manner, the N ΔE calculation circuits calculate an energy change. After then, the same process as described above is performed by the selection circuit 12, the identification information calculation unit 13, and the updating unit 14. A state ($x_1$ to $x_N$) obtained after such state updating process is repeated a predetermined number of times is output as a solution to the optimization problem, for example.

The updating unit 14 may update energy based on the energy change by the change of $x_l$ and $x_m$ or $x_n$. The updating unit 14 may hold minimum energy at each update time and a state (a state at the minimum energy) when the minimum energy is obtained. In this case, the updating unit 14 may output the state at the minimum energy held when the state updating process is repeated the predetermined number of times, as a solution.

As described above, according to the optimization device 10 of the first embodiment, based on an energy change when a bit having a value of 1 and a bit having a value of 0 are respectively changed one by one in all bits (N bits), it is determined which two bits are permitted to be transitioned. The optimization device 10 updates values of the determined two bits in one state updating process. In this way, the state transition not satisfying the k-hot constraint is suppressed, and the search space may be made smaller. For this reason, it is possible to speed up the search of the ground state.

For example, in a case where N=1024 and k=32, all states are $2^{1024}$, that is, approximately $10^{307}$, while the number of states satisfying the k-hot constraint is 1024!/(1024−32)! ("!" represents factorial), that is, approximately $10^{96}$. For example, as compared with a case of searching for a state of $2^{1024}$, the number of states to be searched decreases to $1/10^{211}$ ($=1;10^{(307-96)}$).

According to the optimization device 10, since the k-hot constraint term of the second item on the right side of the equation (2) may be deleted, an energy barrier occurring due to the k-hot constraint term may be reduced, and a time of the state transition may be shortened.

Since the k-hot constraint term of the second item on the right side of the equation (2) may be deleted as described above, the number of bits for representing a weighted value may be reduced, and the amount of hardware for storing the weighted value may be reduced.

For example, when the optimization device 10 calculates a traffic optimization problem, in a case where N=16 and $\lambda_1$=100, a range of a weighted value is 4≤$W_{ij}$≤214. On the other hand, in a case of eliminating the k-hot constraint term of the second item on the right side of the equation (2) (for example, in the case of $\lambda_1$=0), the range of the weighted value is 4≤$W_{ij}$≤14. For example, the number of bits for representing the weighted value may be reduced from 8 bits to 4 bits. In a case where a scale of the problem is increased, for example, N=1024 and $\lambda_1$=10000, the range of the weighted value is 4≤$W_{ij}$≤20108. On the other hand, in a case of $\lambda_1$=0, the range of the weighted value is 4≤$W_{ij}$≤108. For example, the number of bits or representing the weighted value may be reduced from 16 bits to 7 bits.

Thus, as a size of the problem increases, a reduction effect of the number of bits of the weighted value becomes more remarkable.

Figure 2:
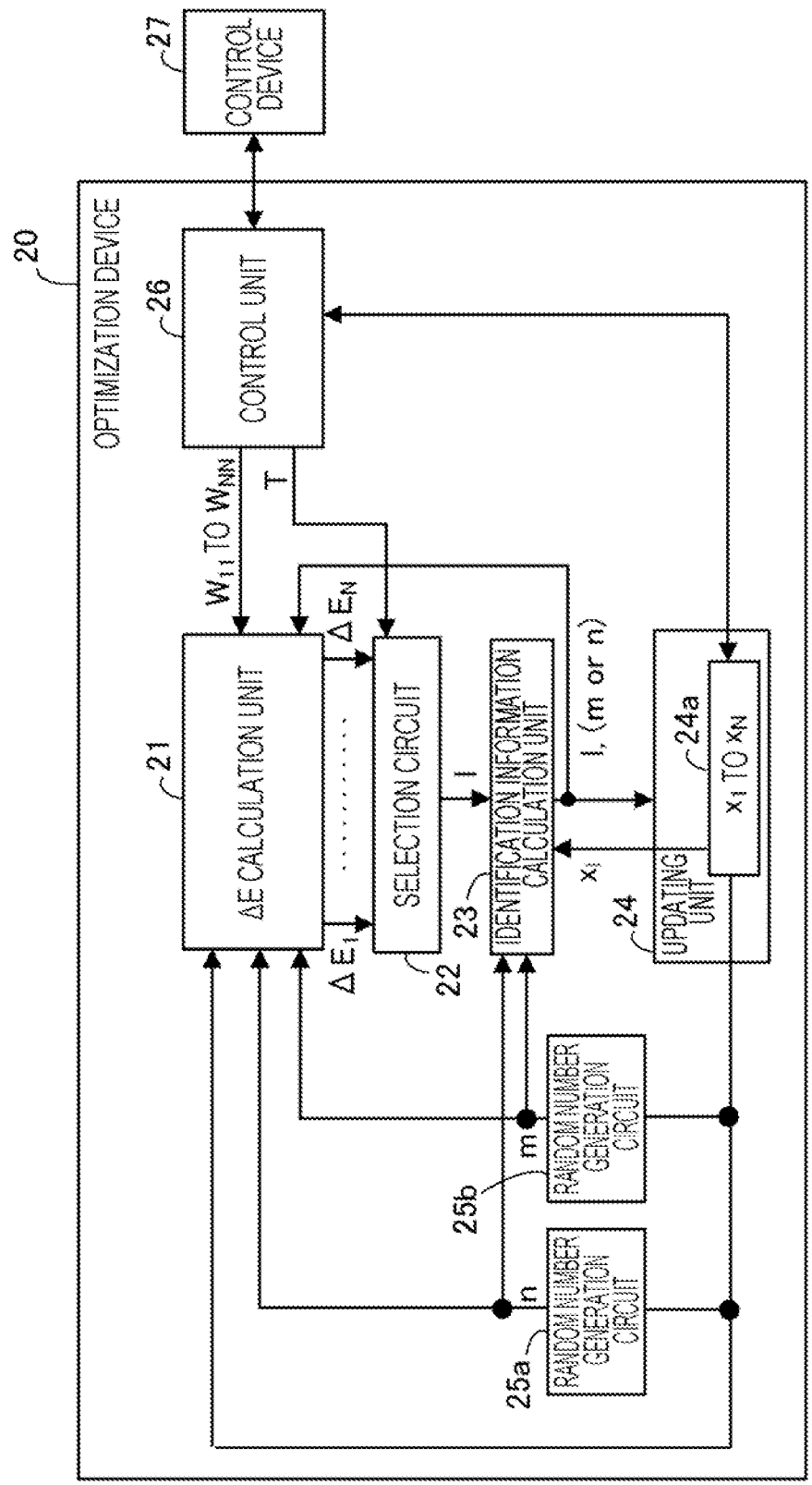
FIG. 2 is a diagram illustrating an example of an optimization device according to a second embodiment.

In a case of N−k>2 or k>2, (N−k)k>N, and a state satisfying the k-hot constraint is generally larger than N. Meanwhile, in the optimization device 10 described above, since one state transition is performed from N state transition candidates by using random numbers n and m, it is possible to perform a process using the optimization device 10 corresponding to N bits, Second Embodiment FIG. 2 is a diagram illustrating an example of an optimization device according to a second embodiment.

An optimization device 20 includes a ΔE calculation unit 21, a selection circuit 22, an identification information calculation unit 23, an updating unit 24, random number generation circuits 25a and 25b, and a control unit 26.

The ΔE calculation unit 21 calculates an energy change ($\Delta E_1$ to $\Delta E_N$) when transitioning from a state satisfying the k-hot constraint to another state satisfying the k-hot constraint by state transition of Hamming distance=2.

Based on a magnitude relationship between the thermal excitation energy and $\Delta E_1$ to $\Delta E_N$, the selection circuit 22 outputs index=l identifying one bit having a value permitted to be updated among N bits. The thermal excitation energy is determined based on a random number and T input from the control unit 26. In some cases, depending on the magnitude relationship between the thermal excitation energy and $\Delta E_1$ to $\Delta E_N$, update is not permitted even for one of N bits. It is assumed that the selection circuit 22 outputs a flag for indicating whether the update is permitted.

The identification information calculation unit 23 outputs one of index=m and index=n, based on a value ($x_l$) of a bit corresponding to index=l output by the selection circuit 22. The random number generation circuits 25a and 25b supply n and m. In a case where $x_l$ is 0, index=m of a bit having a value of 1 is output. In a case where $x_l$ is 1, index=n of a bit having a value of 0 is output. Hereinafter, the identification information calculation unit 23 also outputs index=l and the flag supplied from the selection circuit 22. Index=l, m, n is supplied to the ΔE calculation unit 21 and is used when updating a local field value for each bit used to calculate an energy change.

In a case where the flag is a value indicating that the update is not permitted, the identification information calculation unit 23 sets, for example, index=l, m, n as an invalid value (for example, 0).

The updating unit 24 includes a storage unit 24a which holds values ($x_1$ to $x_N$) of N bits. The storage unit 24a is realized by, for example, using a register, an SRAM, or the like. In a case where the flag has a value to permit update, the updating unit 24 respectively updates $x_l$ and $x_m$ or $x_n$. The updating unit 24 may update energy based on the energy change by the change of $x_l$ and $x_m$ or $x_n$. The updating unit 24 may hold minimum energy at each update time and a state (a state at the minimum energy) when the minimum energy is obtained. The updating unit 24 supplies $x_1$ to $x_N$ to the ΔE calculation unit 21. An example of a process of the ΔE calculation unit 21 using $x_1$ to $x_N$ will be described below.

Among the N bits, the random number generation circuit 25a outputs the random number (n) which is one of indexes of bits having a value of 0, based on $x_1$ to $x_N$. For example, the random number generation circuit 25a is realized by a circuit which outputs indexes of (N−k) bits having a value of 0 among $x_1$ to $x_N$, a circuit which selects one of the output (N−k) indexes by using a random number, and a circuit which generates the random number. An example of the circuit which generates a random number includes, for example, an LFSR.

Among the N bits, the random number generation circuit 25b outputs the random number (m) which is one of indexes of bits having a value of 1, based on $x_1$ to $x_N$. For example, the random number generation circuit 25b is realized by a circuit which outputs indexes of k bits having a value of 1 among $x_1$ to $x_N$, a circuit which selects one of the output k indexes by using a random number, and a circuit which generates the random number.

The control unit 26 performs an initial setting process to be described below of the optimization device 20. Each time the process of updating the state of the Ising model is repeated the predetermined number of times, the control unit 26 reduces a value of T, for example, according to a temperature schedule designated by a control device 27.

The control unit 26 obtains a state ($x_1$ to $x_N$) held by the storage unit 24a after the state updating process is repeated the predetermined number of times, and transmits the state ($x_1$ to $x_N$) to the control device 27 as a solution for the optimization problem, for example. In a case where the storage unit 24a of the updating unit 24 holds minimum energy or the state at the minimum energy, after the state updating process is repeated the predetermined number of times, the control unit 26 may obtain information therefor, and may transmit the information to the control device 27.

The control unit 26 may be realized by an application specific electronic circuit such as an application-specific integrated circuit (ASIC), a field-programmable gate array (FPGA), or the like, for example. The control unit 26 may be a processor such as a central processing unit (CPU), a digital signal processor (DSP), or the like. In this case, the processor performs the process described above by executing a program stored in a memory (not illustrated).

(Example of ΔE Calculation Unit 21)

Figure 3:
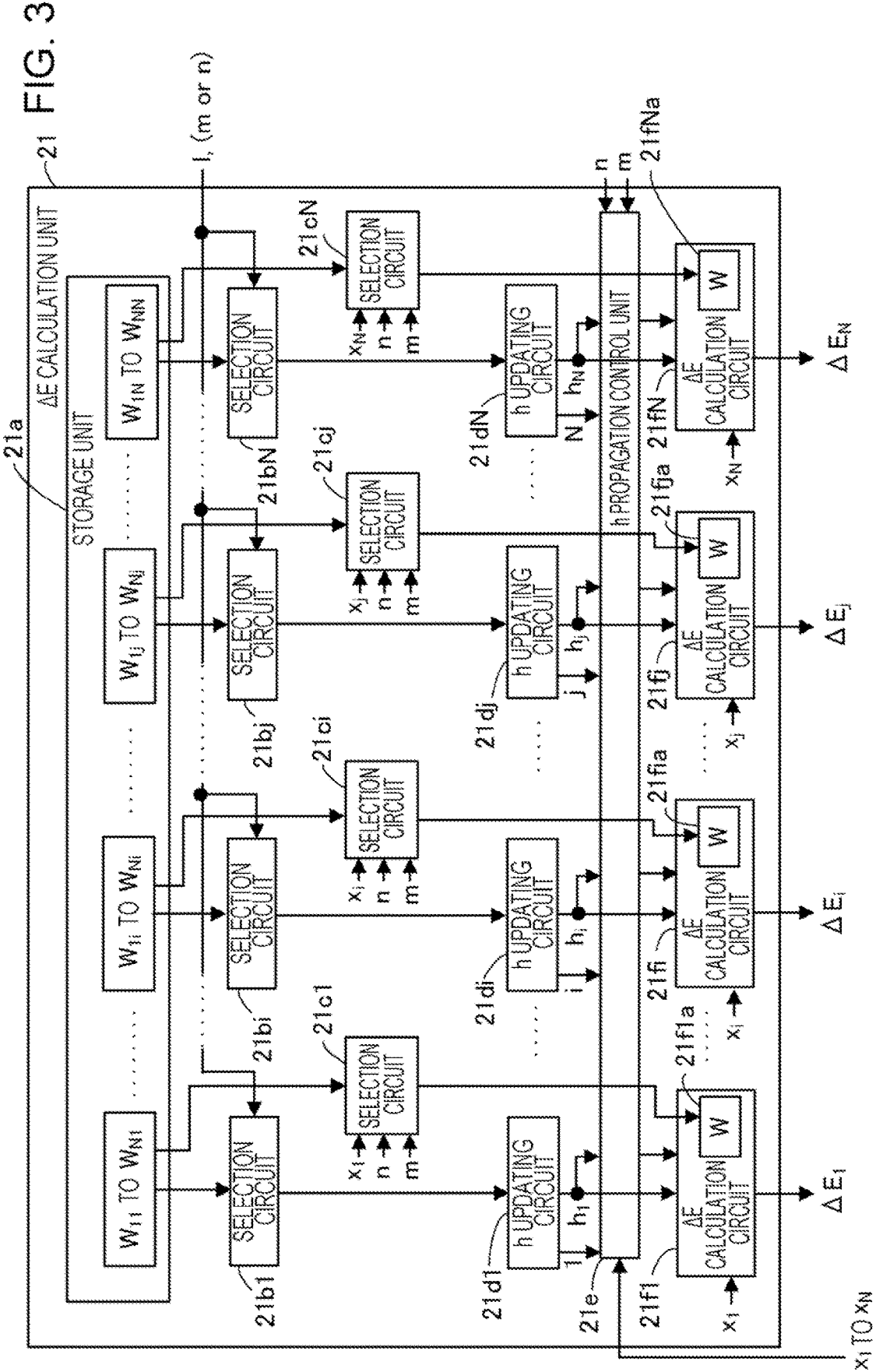
FIG. 3 is a diagram illustrating an example of a ΔE calculation unit.

FIG. 3 is a diagram illustrating an example of the ΔE calculation unit. The ΔE calculation unit 21 includes a storage unit 21a, selection circuits 21b1 to 21bN and 21c1 to 21cN, h updating circuits 21d1 to 21dN, an h propagation control unit 21e, and LIE calculation circuits 21f1 to 21fN.

The storage unit 21a stores weighted values ($W_{11}$ to $W_{NN}$) indicating a magnitude of interaction among all bits corresponding to all spins included in the Ising model. $W_{11}$ to $W_{NN}$ is stored in the storage unit 21a by the control unit 26, at an initial setting process. The storage unit 21a is realized by, for example, using a register, an SRAM, or the like.

Each of the selection circuits 21b1 to 21bN selects two among the weighted values stored in the storage unit 21a based on index=l and index=m or index=n output by the identification information calculation unit 23, and outputs the two weighted values.

For example, a selection circuit 21bi selects and outputs $W_{li}$ and $W_{mi}$ or $W_{ni}$ among $W_{1i}$ to $W_{Ni}$. In a case where l is supplied to the selection circuit 21bi first among index=l and index=m or index=n, the selection circuit 21bi outputs $W_{li}$ earlier than $W_{mi}$ or $W_{ni}$. In a case where m or n is supplied to the selection circuit 21bi first among index=l and index=m or index=n, the selection circuit 21bi outputs $W_{mi}$ or $W_{ni}$ earlier than $W_l$. In the same manner, a selection circuit 21bj selects and outputs $W_{lj}$ and $W_{mj}$ or $W_{nj}$ among $W_{1j}$ to $W_{Nj}$.

A value ($x_1$ to $x_N$) of a bit corresponding to one of indexes of 1 to N, and n and m are input to each of the selection circuits 21c1 to 21cN, as a selection signal. Each of the selection circuits 21c1 to 21cN selects a weighted value indicating a magnitude of interaction between an input bit when a value of the bit is 0 and a bit corresponding to index=m. Each of the selection circuits 21c1 to 21cN selects a weighted value indicating a magnitude of interaction between an input bit when a value of the bit is 1 and a bit corresponding to index=n. Each of the selection circuits 21c1 to 21cN supplies the selected weighted value to one of storage units 21f1a to 21fNa of the ΔE calculation circuits 21f1 to 21fN.

For example, the selection circuit 21ci selects $W_{mi}$ among $W_{1i}$ to $W_{Ni}$ and supplies $W_{mi}$ to the storage unit 21fia of the ΔE calculation circuit 21fi in a case where $x_i$ is 0, and selects $W_{ni}$ among $W_{1i}$ to $W_{Ni}$ and supplies $W_{ni}$ to the storage unit 21fia in a case where $x_i$ is 1. The selection circuit 21cj selects $W_{mj}$ among $W_{1j}$ to $W_{Nj}$ and supplies $W_{mj}$ to the storage unit 21*fja* of the ΔE calculation circuit 21*fj* in a case where $x_j$ is 0, and selects $W_{nj}$ among $W_{1j}$ to $W_{Nj}$ and supplies $W_{nj}$ to the storage unit 21*fja* in a case where $x_j$ is 1.

Each of the h updating circuits 21*d*1 to 21*d*N includes a holding unit (for example, a register) (not illustrated), and holds and updates one of $h_1$ to $h_N$.

For example, the h updating circuit 21*di* updates $h_i$ by using $W_{li}$ and $W_{mi}$ or $W_{ni}$ selected by the selection circuit 21*bi*. In a case where the selection circuit 21*bi* selects $W_{li}$ and $W_{mi}$ (in a case of $x_j=0$), the h updating circuit 21*di* updates $h_i$ by calculating $h_i - W_{mi} + W_{li}$. In a case where the selection circuit 21*bi* selects $W_{li}$ and $W_{ni}$ (in a case of $x_j=1$), the h updating circuit 21*di* updates $h_i$ by calculating $h_i - W_{li} + W_{ni}$. The h updating circuit 21*dj* updates $h_j$ by using $W_{ij}$ and $W_{mj}$ or $W_{nj}$ selected by the selection circuit 21*bj*. In a case where the selection circuit 21*bj* selects $W_{lj}$ and $W_{mj}$ (in a case of $x_j=0$), the h updating circuit 21*dj* updates $h_j$ by calculating $h_j - W_{mj} + W_{lj}$. In a case where the selection circuit 21*bj* selects $W_{lj}$ and $W_{nj}$ (in a case of $x_j=1$), the h updating circuit 21*dj* updates $h_j$ by calculating $h_j - W_{lj} + W_{nj}$.

Initial values of $h_1$ to $h_N$ are, for example, bias values ($b_1$ to $b_N$), and are set by the control unit 26 at the time of the initial setting process. The h updating circuits 21*d*1 to 21*d*N are realized, for example, by using an adder or a subtractor.

Each of the h updating circuits 21*d*1 to 21*d*N holds an index indicating which bit the local field value to be updated belongs to, and outputs the index.

Based on $x_1$ to $x_N$, index=1 to N, and m and n output by the random number generation circuits 25*a* and 25*b*, the h propagation control unit 21*e* controls propagation destinations (supply destinations) of $h_m$ and $h_n$.

Figure 4:
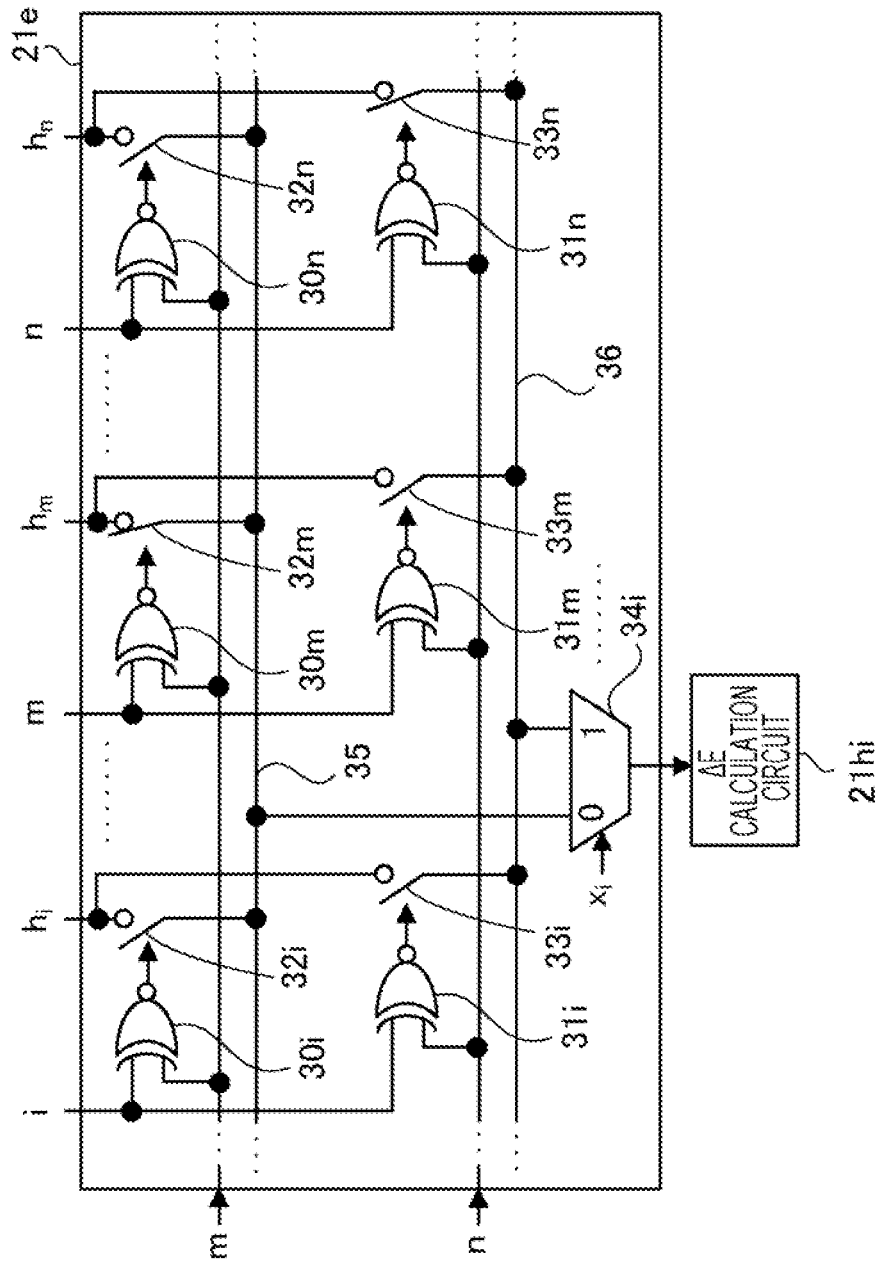
FIG. 4 is a diagram illustrating an example of an h propagation control unit.

FIG. 4 is a diagram illustrating an example of an h propagation control unit.

FIG. 4 illustrates a part of the h propagation control unit 21*e* of FIG. 3 (only a part which performs propagation control of $h_j$, $h_m$, $h_n$ on bits corresponding to index=i, m, n, for simplicity of the drawing). The h propagation control unit 21*e* includes exclusive NOR (ExNOR) circuits 30*i*, 30*m*, 30*n*, 31*i*, 31*m*, and 31*n*, switches 32*i*, 32*m*, 32*n*, 33*i*, 33*m*, and 33*n*, a selector 34*i*, an $h_m$ propagation bus 35, and an $h_n$ propagation bus 36.

index=i is input to one input terminals of the ExNOR circuits 30*i* and 31*i*, index=m is input to one input terminals of the ExNOR circuits 30*m* and 31*m*, and index=n is input to one input terminals of the ExNOR circuits 30*n* and 31*n*. m output from the random number generation circuit 25*b* is input to the other input terminals of the ExNOR circuits 30*i*, 30*m*, and 30*n*, and n output from the random number generation circuit 25*a* is input to the other input terminals of the ExNOR circuits 31*i*, 31*m*, and 31*n*.

$h_i$ is supplied to one terminals of the switches 32*i* and 33*i*, $h_m$ is supplied to one terminals of the switches 32*m* and 33*m*, and $h_n$ is supplied to one terminals of the switches 32*n* and 33*n*. The other terminals of the switches 32*i*, 32*m* and 32*n* are coupled to the $h_m$ propagation bus 35, and the other terminals of the switches 33*i*, 33*m* and 33*n* are coupled to the $h_n$ propagation bus 36.

The switch 32*i* is turned on in a case where a control signal output from the ExNOR circuit 30*i* is 1, and is turned off in a case where the control signal is 0. The switch 33*i* is turned on in a case where a control signal output from the ExNOR circuit 31*i* is 1, and is turned off in a case where the control signal is 0. The switch 32*m* is turned on in a case where a control signal output from the ExNOR circuit 30*m* is 1, and is turned off in a case where the control signal is 0. The switch 33*m* is turned on in a case where a control signal output from the ExNOR circuit 31*m* is 1, and is turned off in a case where the control signal is 0. The switch 32*n* is turned on in a case where a control signal output from the ExNOR circuit 30*n* is 1, and is turned off in a case where the control signal is 0. The switch 33*n* is turned on in a case where a control signal output from the ExNOR circuit 31*n* is 1, and is turned off in a case where the control signal is 0.

The switches 32*i*, 32*m*, 32*n*, 33*i*, 33*m* and 33*n* are, for example, transfer gates. One input terminal of the selector 34*i* is coupled to the $h_m$ propagation bus 35, and the other input terminal is coupled to the $h_n$ propagation bus 36. The output terminal of the selector 34*i* is coupled to the ΔE calculation circuit 21*hi*. The selector 34*i* outputs a local field value propagated to the $h_m$ propagation bus 35 in a case where $x_i$ supplied as a selection signal is 0, and outputs a local field value propagated to the $h_n$ propagation bus 36 in a case where $x_i$ is 1. Although not illustrated in FIG. 4, the same selector as the selector 34*i* is also coupled to each of the ΔE calculation circuits other than the ΔE calculation circuit 21*hi*.

When m is input from the random number generation circuit 25*b* to the h propagation control unit 21*e*, the ExNOR circuit 30*m* outputs 1 since both inputs are equal to each other. Thus, the switch 32*m* is turned on, and $h_m$ is propagated to the $h_m$ propagation bus 35. When n is input from the random number generation circuit 25*a*, the ExNOR circuit 31*n* outputs 1 since both inputs are equal to each other. Thus, the switch 33*n* is turned on, and $h_n$ is propagated to the $h_n$ propagation bus 36. The ExNOR circuits 30*i*, 30*n*, 31*i*, and 31*m* output 0 since both inputs are different from each other. Thus, the switches 32*i*, 32*n*, 33*i*, and 33*m* are turned on. In a case where $x_i$ supplied to the selector 341 is 0, $h_m$ is supplied to the ΔE calculation circuit 21*hi*, and in a case where $x_i$ is 1, $h_n$ is supplied to the ΔE calculation circuit 21*hi*.

Figure 5:
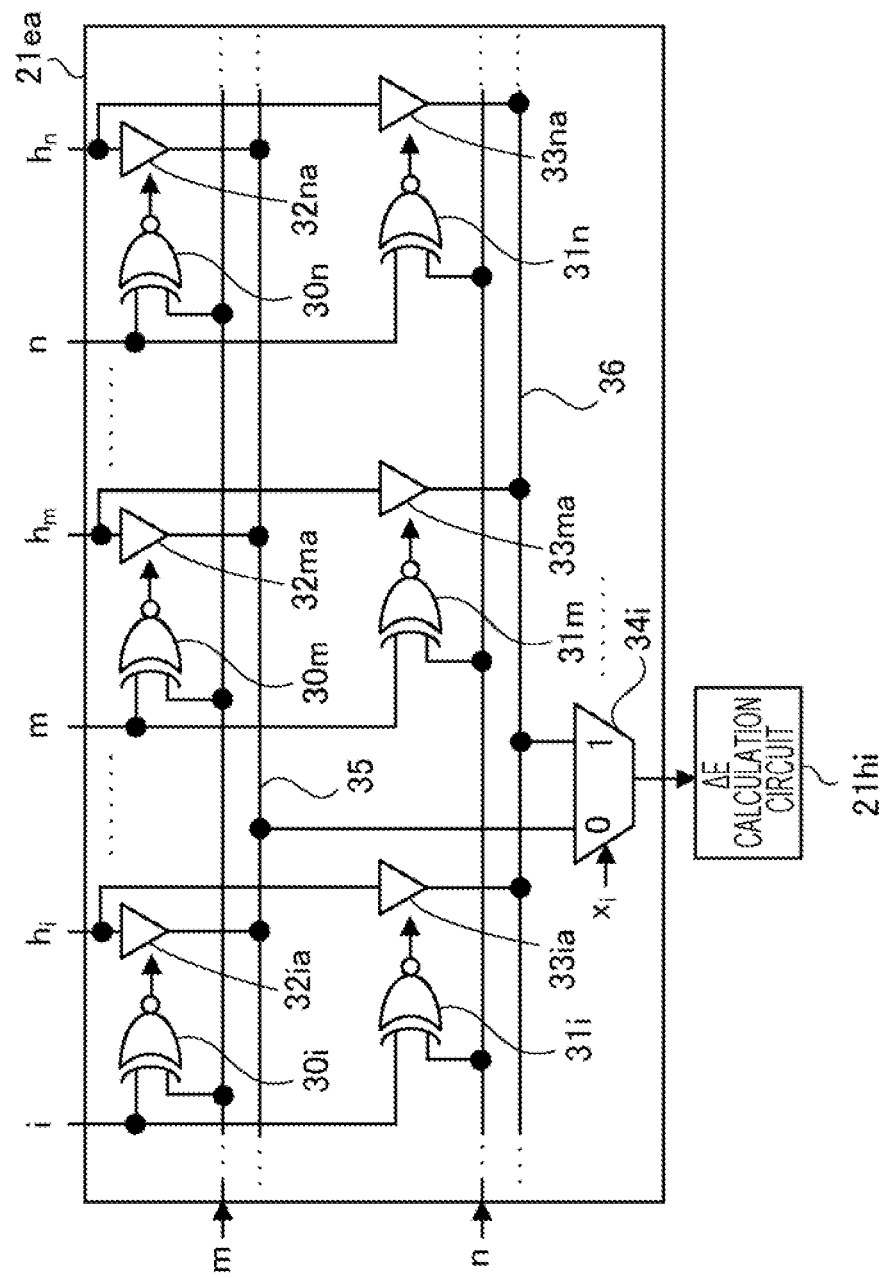
FIG. 5 is a diagram illustrating another example of the h propagation control unit.

FIG. 5 is a diagram illustrating another example of the h propagation control unit. FIG. 5 also illustrates a part of the h propagation control unit 21*e* in FIG. 3 (only a part which performs propagation control of $h_j$, $h_m$, $h_n$ on bits corresponding to index=i, m, n, for simplicity of the drawing). The h propagation control unit 21*ea* illustrated in FIG. 5 uses tri-state buffers 32*ia*, 32*ma*, 32*na*, 33*ia*, 33*ma*, and 33*na* instead of the switches 32*i*, 32*m*, 32*n*, 33*i*, 33*m*, and 33*n* illustrated in FIG. 4. Each of the tri-state buffers 321*a*, 32*ma*, 32*na*, 33*ia*, 33*ma*, and 33*na* outputs an input signal (a local field value) in a case where a control signal is 1, and set an output terminal in a high impedance state in a case where the control signal is 0. The other operations of the h propagation control unit 21*ea* are the same as the operations of the h propagation control unit 21*e* illustrated in FIG. 4.

Returning to the description in FIG. 3, The ΔE calculation circuits 21*f*1 to 21*f*N calculate $\Delta E_1$ to $\Delta E_N$ when transitioning from a state satisfying the k-hot constraint to another state satisfying the k-hot constraint by state transition of Hamming distance=2 by using a local field value and a weighted value.

One of $h_1$ to $h_N$ is directly supplied from one of the h updating circuits 21*d*1 to 21*d*N to each of the ΔE calculation circuits 21*f*1 to 21*f*N. The h propagation control unit 21*e* supplies $h_m$ to the ΔE calculation circuit to which a local field value for a bit having a value of 0 is supplied from one of the h updating circuits 21*d*1 to 21*d*N. The h propagation control unit 21*e* supplies $h_n$ to the ΔE calculation circuit to which a local field value for a bit having a value of 1 is supplied from one of the h updating circuits 21d1 to 21dN. One of $x_1$ to $x_N$ is supplied to each of the ΔE calculation circuits 21f1 to 21fN.

The ΔE calculation circuits 21f1 to 21fN include the storage units 21f1a to 21fNa which hold weighted values for calculating the equation (6). The weighted values held in the storage units $21f1_a$ to $21_fNa$ are selected by the selection circuits $21_c1$ to $21_cN$ described above.

For example, in a case where $x_i$ is updated form 1 to 0 and $x_n$ is updated from 0 to 1, since $\Delta E_i$ is in a case of $h_j=h_n$ and $W_{ij}=W_{ni}$ (where $W_{ni}=W_{in}$) in the equation (6), $\Delta E_i$ may be represented as $\Delta E_i=h_i-h_n+W_{ni}$. On the other hand, in a case where $x_i$ is updated form 0 to 1 and $x_m$ is updated from 1 to 0, since $\Delta E_i$ is in a case of $h_j=h_m$ and $h_j=h_i$ in the equation (6), $\Delta E_i$ may be represented as $\Delta E_i=h_j-h_m+W_{mi}$.

For this reason, the ΔE calculation circuit 21fi outputs $\Delta E_i=h_i-h_n+W_{ni}$ in a case where current $x_i$ is 1, and outputs $\Delta E_i=-h_i+h_m+W_{mi}$ in a case where current $x_i$ is 0.

The ΔE calculation circuits 21f1 to 21fN are realized, for example, by using an adder, a subtractor, and a selector. The storage units 21f1a to 21fNa are realized by, for example, using a register, an SRAM, or the like.

(Example of Selection Circuit 22)

Figure 6:
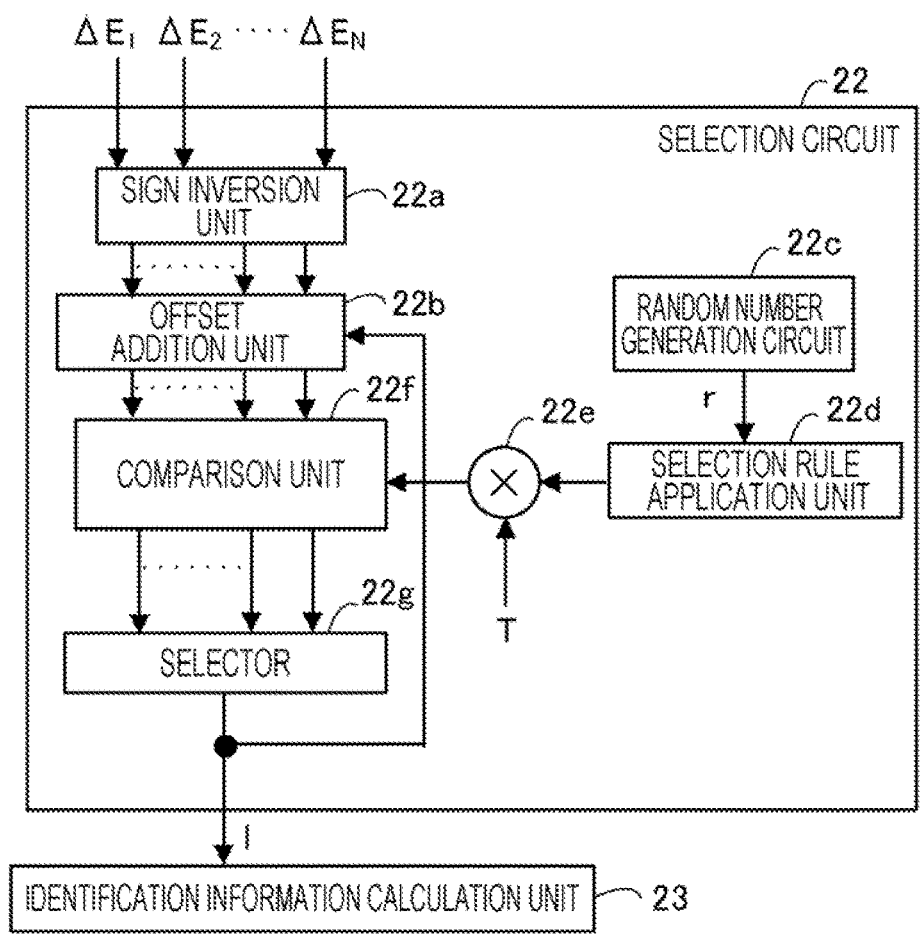
FIG. 6 is a diagram illustrating an example of a selection circuit.

FIG. 6 is a diagram illustrating an example of a selection circuit. The selection circuit 22 includes a sign inversion unit 22a, an offset addition unit 22b, a random number generation circuit 22c, a selection rule application unit 22d, a multiplier 22e, a comparison unit 22f, and a selector 22g.

The sign inversion unit 22a multiplies each of $\Delta E_1$, $\Delta E_2, \ldots,$ and $\Delta E_N$ by −1 to invert a sign. The offset addition unit 22b adds an offset value to each of output values ($-\Delta E_1$ to $-\Delta E_N$) of the sign inversion unit 22a. The offset addition unit 22b increases the offset value when a flag output by the selector 22g to be described below indicates that update is not permitted (for example, when state transition does not occur). On the other hand, the offset addition unit 22b sets the offset value to 0 when the flag indicates that update is permitted (for example, when the state transition occurs). As the offset value becomes large, it is easier to permit the state transition, and in a case where the current state is in the local solution, the escape from the local solution is promoted.

The random number generation circuit 22c generates uniform random numbers (r) equal to or more than 0 and equal to or less than 1.

The selection rule application unit 22d outputs a value based on a selection rule (a metropolis method or Gibbs method) for performing simulated annealing.

In a case where simulated annealing is performed, when a permission probability A(ΔE, T) of the state transition which causes a certain energy change is determined as in the following equations (7) and (8), it is known that the state reaches an optimal solution at the limit of time (number of times of reiteration) of infinity.

$$A(\Delta E, T) = f(-\Delta E/T) \quad (7)$$

$$f(-\Delta E/T) = \begin{cases} \min[1, \exp(-\Delta E/T)] & \text{metropolis method} \\ 1/[1+\exp(\Delta E/T)] & \text{Gibbs method} \end{cases} \quad (8)$$

In the equations (7) and (8), T is the temperature parameter described above.

In a case of using the permission probability A(ΔE, T) represented by the equation (7), when a normal state is reached after sufficient reiteration, an occupancy probability of each state follows the Boltzmann distribution for a thermal equilibrium state in thermodynamics. Since the occupancy probability of a low energy state increases when a temperature is gradually lowered from the high temperature, the low energy state is obtained when the temperature is sufficiently lowered. Since the behavior is similar to a state change when annealing the material, the method is called simulated annealing. At this time, a case where the state transition in which energy increases probabilistically occurs corresponds to thermal excitation in physics.

It is possible to realize a circuit which outputs a flag (=1) indicating that state transition which causes ΔE with the permission probability A(ΔE, T) is permitted, by a comparator which outputs a value based on a comparison result of f(−ΔE/T) in the equations (7) and (8) and the uniform random number r.

Meanwhile, it is also possible to realize the same function even when the following modification is made. Even when the same monotonically increasing function acts on two numbers, a magnitude relationship does not change. Therefore, even when the same monotonically increasing function acts on two inputs of the comparator, the output of the comparator does not change. For example, it is possible to use $f^{-1}(-\Delta E/T)$ which is an inverse function of f(−ΔE/T) as a monotonically increasing function which acts on f(−ΔE/T) and $f^{-1}(r)$ obtained by setting −ΔE/T of $f^{-1}(-\Delta E/T)$ to r as a monotonically increasing function which acts on a uniform random number. In this case, a circuit having the same function as the above-described comparator may be a circuit which outputs 1 when −ΔE/T is greater than $f^{-1}(r)$. Since T is positive, the circuit may be a circuit which outputs 1 when −ΔE is larger than $T \cdot f^{-1}(r)$.

The selection rule application unit 22d outputs a value of $f^{-1}(r)$ by using a conversion table for converting the input uniform random number into a value of $f^{-1}(r)$ described above. In a case where the metropolis method is applied, $f^{-1}(r)$ is log(r). The conversion table is stored, for example, in a memory such as a random-access memory (RAM), a flash memory, or the like.

The multiplier 22e outputs a product $(T \cdot f^{-1}(r))$ of T and $f^{-1}(r)$. $T \cdot f^{-1}(r)$ corresponds to thermal excitation energy.

The comparison unit 22f compares an addition result by the offset addition unit 22b for each of $\Delta E_1$ to $\Delta E_N$ with $T \cdot f^{-1}(r)$, and outputs 1 as a flag for the addition result larger than $T \cdot f^{-1}(r)$. The comparison unit 22f outputs 0 as a flag for the addition result equal to or less than $T \cdot f^{-1}(r)$.

Based on a flag for each of $\Delta E_1$ to $\Delta E_N$, the selector 22g outputs index=l of a bit permitted to be updated and the flag. In a case where there are a plurality of bits permitted to be updated, an index of one bit among the bits is output as index=l based on a random number. Even in a case where there is no bit permitted to be updated, an index of any bit is output. In this case, the flag output by the selector 22g is 0.

For example, the selector 22g outputs an N-bit value in which a value of the l-th bit is 1 and values of the other bits are 0, as index=l.

The selection circuit 12 of the optimization device 10 according to the first embodiment illustrated in FIG. 1 may also be realized by using the circuit as illustrated in FIG. 6.

(Example of Identification Information Calculation Unit 23)

Figure 7:
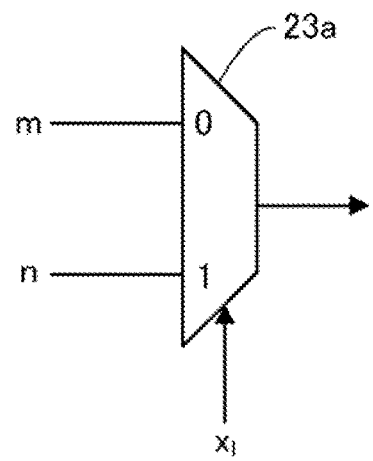
FIG. 7 is a diagram illustrating an example of an identification information calculation unit.

FIG. 7 is a diagram illustrating an example of an identification information calculation unit.

The identification information calculation unit 23 may be realized by, for example, a selector 23a. The random number generation circuit 25b inputs m to one input terminal of the selector 23a, and the random number generation circuit 25a inputs n to the other input terminal. The selector 23a outputs m in a case where $x_l$ supplied from the updating unit 24 is 0, and outputs n in a case where $x_l$ is 1.

(Example of Overall Operation of Optimization Device 20)

Figure 8:
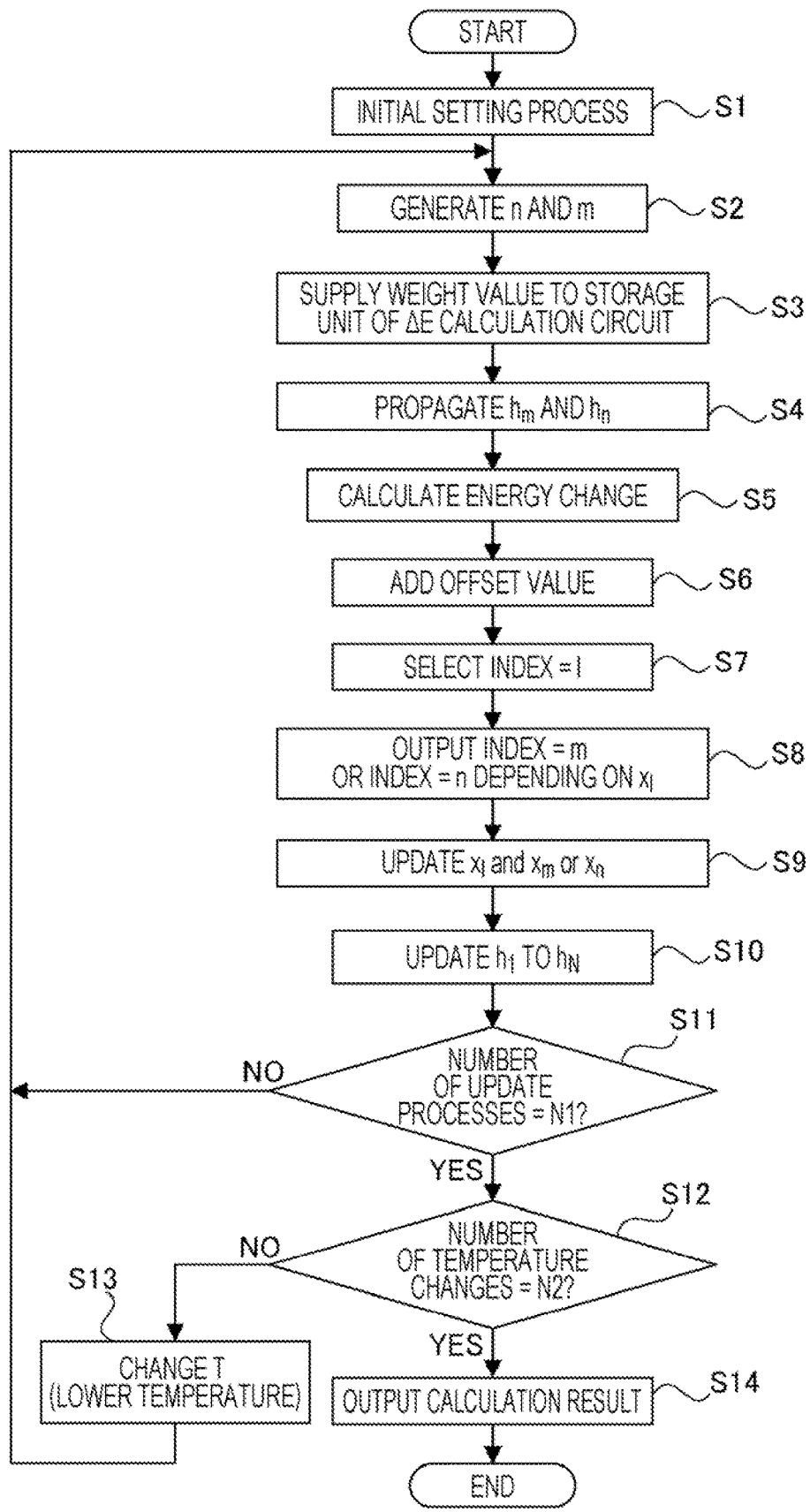
FIG. 8 is a flowchart illustrating a flow of a process of an example of the optimization device according to the second embodiment.

FIG. 8 is a flowchart illustrating a flow of a process of an example of the optimization device according to the second embodiment.

First, the control unit 26 performs an initial setting process of the optimization device 20 (step S1). For example, the following processes are performed as the initial setting process. The control unit 26 stores $W_{11}$ to $W_{NN}$, received from the control device 27 in the storage unit 21a of the ΔE calculation unit 21. The control unit 26 sets initial values of $h_1$ to $h_N$ (for example, bias values) received from the control device 27 to the h updating circuits 21d1 to 21dN of the ΔE calculation unit 21. The control unit 26 sets an initial value of the temperature parameter T to the selection circuit 22 based on an annealing condition received from the control device 27. The control unit 26 stores $x_1$ to $x_N$ (all zeros) in the storage unit 24a. After then, the control unit 26 sets k values among $x_1$ to $x_N$ to 1 by using a random number. The control unit 26 causes the updating unit 24 to update k state variables from 0 to 1 one by one, and causes the h updating circuits 21d1 to 21dN to update $h_1$ to $h_N$ accordingly. The control unit 26 may update $h_1$ to $h_N$ and may set the updated $h_1$ to $h_N$ to the h updating circuits 21d1 to 21dN.

After the initial setting process described above is completed, the random number generation circuits 25a and 25b generate n and m based on $x_1$ to $x_N$ (step S2).

Based on $x_1$ to $x_N$ and n and m, the ΔE calculation unit 21 of the selection circuits 21c1 to 21cN selects a weighted value used for calculating $ΔE_1$ to $ΔE_N$ and supplies the weighted value to the storage units 21f1a to 21fNa (step S3).

Based on $x_1$ to $x_N$, index=1 to N, and m and n output by the random number generation circuits 25a and 25b, the h propagation control unit 21e of the ΔE calculation unit 21 propagates $h_m$ and $h_n$ (step S4). According to the process of the h propagation control unit 21e described above, among the ΔE calculation circuits 21f1 to 21fN, the h propagation control unit 21e supplies $h_m$ the ΔE calculation circuit to which a local field value for a bit having a value of 0 is directly supplied from one of the h updating circuits 21d1 to 21dN. The h propagation control unit 21e supplies $h_n$ to the ΔE calculation circuit to which a local field value for a bit having a value of 1 is directly supplied from one of the h updating circuits 21d1 to 21dN.

After then, as described above, the ΔE calculation circuits 21f1 to 21fN calculates $ΔE_1$ to $ΔE_N$ (step S5). In the selection circuit 22 illustrated in FIG. 6, an offset value is added (step S6), and index=1 is selected (step S7). The identification information calculation unit 23 outputs index=m or index=n by the process described above, according to $x_l$ (step S8).

After then, the updating unit 24 updates $x_l$ and $x_m$ or $x_n$ stored in the storage unit 24a (step S9), and the h updating circuits 21d1 to 21dN of the ΔE calculation unit 21 update $h_1$ to $h_N$ according to the update of $x_l$ and $x_m$ or $x_n$ (step S10).

After then, the control unit 26 determines whether or not the number of times the state updating process is performed reaches a predetermined number N1 (step S11). In a case where the number of update processes does not reach the predetermined number N1, the processes of steps S2 to S10 are repeated.

In a case where the number of update processes reaches the predetermined number N1, the control unit 26 determines whether or not the number of changes in T (the number of temperature changes) reaches a predetermined number N2 (step S12).

In a case where the number of temperature changes does not reach the predetermined number N2, the control unit 26 changes T (decreases the temperature) (step S13). A method of changing values of the predetermined numbers of times N1 and N2 and T (decreasing how many values at a time or the like) is determined based on an annealing condition. After the process of step S13, the processes from step S2 are repeated.

In a case where the number of temperature changes reaches the predetermined number N2, the control unit 26 obtains a value (a variable $x_i$ (i=1 to N)) of each bit at that time from the storage unit 24a, and transmits (outputs) the value as a solution (a calculation result) to the control device 27 (step S14). A display device may be coupled to the control unit 26. In this case, the control unit 26 may display the calculation result on the display device.

The updating unit 24 may update energy based on an energy change due to values of two bits corresponding to index=l and index=m or index=n being changed. The updating unit 24 may hold minimum energy at each update time and a state (a state at the minimum energy) when the minimum energy is obtained. In this case, when the number of temperature changes reaches the predetermined number N2, the control unit 26 may obtain the state at the minimum energy held by the updating unit 24 and output the state as a solution.

The optimization device 20 according to the second embodiment as described above has the same advantage as that of the optimization device 10 according to the first embodiment.

Figure 9:
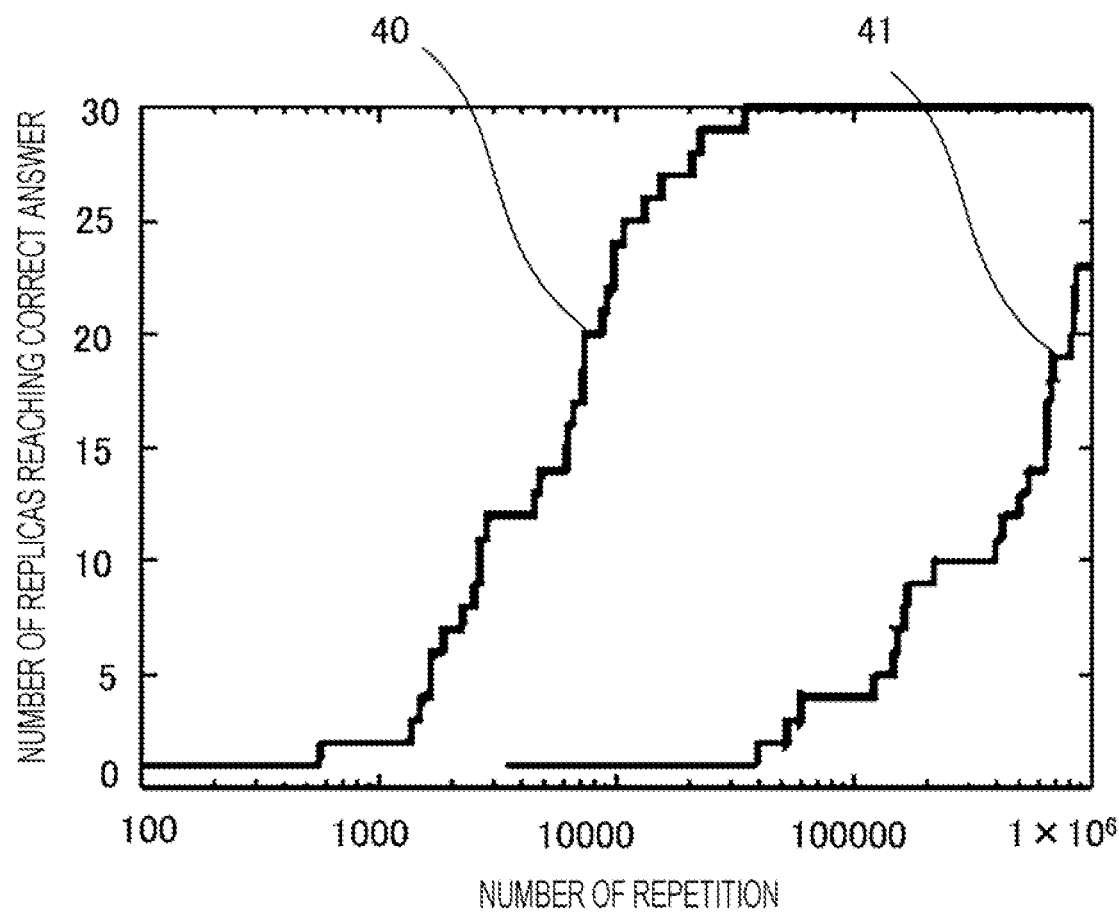
FIG. 9 is a diagram illustrating a simulation result representing a calculation shortening effect in a case where the optimization device of the second embodiment is used.

FIG. 9 is a diagram illustrating a simulation result representing a calculation shortening effect in a case where the optimization device of the second embodiment is used.

The horizontal axis represents the number of times the state updating process is repeated, and the vertical axis represents the number of replicas (the number of optimization devices 20) which reach a correct answer.

A problem to be calculated is a traffic optimization problem with 8 cars and 8 routes (represented by the Ising model of 64 bits).

For comparison, FIG. 9 illustrates a simulation result 41 in a case of using an optimization device in the related art which minimizes energy by repeating transition of Hamming distance=1, together with a simulation result 40 in a case of using the optimization device 20 according to the second embodiment.

As illustrated in FIG. 9, in the optimization device 20 of the second embodiment, a convergence time of the solution is reduced by 100 times or more compared to the optimization device in the related art, As described above, one aspect of an optimization device and a control method of the optimization device of the embodiment has been described in accordance with the embodiment, such aspect is a mere example and not limited to the above description.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optimization device comprising:
    k first calculation circuits configured to respectively calculate, among N (N>2) bits corresponding to N spins included in an Ising model obtained by converting a problem to be calculated, a first energy change of the Ising model due to a change of a value of one of k (k>1) first bits having values of 1 and a change of a value of a second bit having a value of 0 selected based on a generated first random number, based on a first local field value for the one of the first bits, a second local field value for the second bit, and a first weighted value, held in a first storage, indicating a magnitude of interaction between the one of the first bits and the second bit;
    (N−k) second calculation circuits configured to respectively calculate, among the N bits, a second energy change of the Ising model due to a change of a value of one of (N−k) third bits having the values of 0 and a change of a value of a fourth bit having a value of 1 selected based on a generated second random number, based on a third local field value for the one of the (N−k) third bits, a fourth local field value for the fourth bit, and a second weighted value, held in a second storage, indicating a magnitude of interaction between the one of the (N−k) third bits and the fourth bit;
    a selection circuit configured to output first bit identification information identifying a bit having a value permitted to be updated, based on a magnitude relationship between thermal excitation energy determined based on an input temperature parameter and a random number, the first energy change output by each of the k first calculation circuits, and the second energy change output by each of the (N−k) second calculation circuits;
    an identification information calculation circuit configured to output one of second bit identification information identifying the second bit and third bit identification information identifying the fourth bit, based on a value of a bit corresponding to the first bit identification information; and
    an updating circuit configured to respectively update a value of a bit corresponding to the first bit identification information and a value of a bit corresponding to the second bit identification information or a value of a bit corresponding to the third bit identification information, based on the first bit identification information and the second bit identification information or the third bit identification information output by the identification information calculation circuit.

2. The optimization device according to claim 1, wherein an initial setting is performed so that k bits among the N bits are set as the k first bits having values of 1 and (N−k) bits among the N bits are set as the (N−k) third bits having values of 0.

3. The optimization device according to claim 1, further comprising:
    a propagation control circuit configured to propagate the second local field value to each of the k first calculation circuits and propagate the fourth local field value to the (N−k) second calculation circuits, based on the first random number, the second random number, values of the N bits, and bit identification information identifying each of the N bits.

4. The optimization device according to claim 1, further comprising:
    a plurality of selection circuits configured to supply the first weighted value to the first storage and supply the second weighted value to the second storage respectively, based on the first random number, the second random number, and a value of one of the N bits.

5. A control method of an optimization device, the control method comprising:
    configuring k first calculation circuits to respectively calculate, among N (N>2) bits corresponding to N spins included in an Ising model obtained by converting a problem to be calculated, a first energy change of the Ising model due to a change of a value of one of k (k>1) first bits having values of 1 and a change of a value of a second bit having a value of 0 selected based on a generated first random number, based on a first local field value for the one of the first bits, a second local field value for the second bit, and a first weighted value, held in a first storage, indicating a magnitude of interaction between the one of the first bits and the second bit;
    configuring (N−k) second calculation circuits to respectively calculate, among the N bits, a second energy change of the Ising model due to a change of a value of one of (N−k) third bits having the values of 0 and a change of a value of a fourth bit having a value of 1 selected based on a generated second random number, based on a third local field value for the one of the (N−k) third bits, a fourth local field value for the fourth bit, and a second weighted value, held in a second storage, indicating a magnitude of interaction between the one of the (N−k) third bits and the fourth bit;
    outputting first bit identification information identifying a bit having a value permitted to be updated, based on a magnitude relationship between thermal excitation energy determined based on an input temperature parameter and a random number, the first energy change output by each of the k first calculation circuits, and the second energy change output by each of the (N−k) second calculation circuits;
    outputting one of second bit identification information identifying the second bit and third bit identification information identifying the fourth bit, based on a value of a bit corresponding to the first bit identification information; and
    updating a value of a bit corresponding to the first bit identification information and a value of a bit corresponding to the second bit identification information or a value of a bit corresponding to the third bit identification information, based on the first bit identification information and the second bit identification information or the third bit identification information output by the identification information calculation circuit.

6. The control method according to claim 5, further comprising:
    performing an initial setting so that k bits among the N bits are set as the k first bits having values of 1 and (N−k) bits among the N bits are set as the (N−k) third bits having values of 0.

* * * * *